United States Patent
Nonaga et al.

(10) Patent No.: US 7,681,961 B2
(45) Date of Patent: Mar. 23, 2010

(54) BRAKE SYSTEM FOR VEHICLE

(75) Inventors: Ikuo Nonaga, Saitama (JP); Hiroshi Koan, Saitama (JP); Akihiko Koike, Saitama (JP); Tsuyoshi Sato, Saitama (JP); Makoto Taniguchi, Saitama (JP); Yutaka Kichima, Saitama (JP); Ichiro Ueno, Saitama (JP); Katsuyuki Takei, Saitama (JP); Takashi Kuboshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 954 days.

(21) Appl. No.: 11/451,141

(22) Filed: Jun. 12, 2006

(65) Prior Publication Data

US 2007/0007817 A1    Jan. 11, 2007

(30) Foreign Application Priority Data

Jun. 28, 2005    (JP) .............................. 2005-188113

(51) Int. Cl.
    *B60T 8/60*    (2006.01)
(52) U.S. Cl. .................. 303/155; 303/20; 188/162; 701/76; 192/219.4
(58) Field of Classification Search .................. 303/155, 303/3, 20, 115.2, 191, 122.03–122.07, 162; 188/156–162, 163–165, 265, 2 D; 180/271; 477/182, 184, 186; 701/70, 71, 76, 80, 92; 192/219.4, 219.6, 222
See application file for complete search history.

(56) References Cited

U.S. PATENT DOCUMENTS

| | | | |
|---|---|---|---|
| 6,631,796 B2 * | 10/2003 | Yanaka et al. ............ 192/219.4 |
| 6,655,507 B2 * | 12/2003 | Miyakawa et al. .......... 188/171 |
| 6,905,181 B2 * | 6/2005 | Iwagawa et al. ............ 303/155 |
| 6,997,289 B2 * | 2/2006 | Iwagawa et al. ............ 188/2 D |
| 2002/0023818 A1 | 2/2002 | Yanaka et al. |
| 2003/0214185 A1 | 11/2003 | Kinder et al. |
| 2006/0186731 A1 * | 8/2006 | Bach ............................ 303/89 |
| 2007/0281827 A1 * | 12/2007 | Shimizu et al. ............... 477/92 |
| 2008/0071454 A1 * | 3/2008 | Shiraki ........................ 701/70 |

FOREIGN PATENT DOCUMENTS

| | | |
|---|---|---|
| DE | 101 41 615 A 1 | 3/2002 |
| DE | 100 63 063 A 1 | 6/2002 |

(Continued)

*Primary Examiner*—Pam Rodriguez
(74) *Attorney, Agent, or Firm*—Carrier, Blackman & Associates, P.C.; Joseph P. Carrier; William D. Blackman (57) ABSTRACT

A brake system for a vehicle includes an electrically operated parking brake drive device which generates an operating force for operating the wheel brakes or dedicated parking brakes in response to energization, and which operates even upon cancellation of the energization while in the operated state. A braking force related amount detector detects a physical quantity related to a braking force exhibited by each of the hydraulic pressure operated wheel brakes. When a detected physical quantity exceeds a reference value in a stopped state of the vehicle, a controller energizes the electrically operated parking brake drive device. Thus, the frequency of operation of the electrically operated parking brake drive device is decreased while eliminating inconvenient operations required to operate the electrically operated parking brake drive device, thereby reducing noise and improving durability.

10 Claims, 8 Drawing Sheets

FOREIGN PATENT DOCUMENTS

| | | |
|---|---|---|
| DE | 101 51 846 B4 | 7/2004 |
| JP | 11-321615 | 11/1999 |
| JP | 2002-067901 | 3/2002 |
| JP | 2002-067909 | 3/2002 |
| JP | 2002-089314 | 3/2002 |
| JP | 2002-255021 | 9/2002 |
| JP | 3595249 | 9/2004 |
| WO | WO 2005/042320 | 5/2005 |

* cited by examiner

BRAKE SYSTEM FOR VEHICLE

CROSS-REFERENCE TO RELATED APPLICATION

The present invention claims priority under 35 USC 119 based on Japanese patent application No. 2005-188113, filed on Jun. 28, 2005. The subject matter of this priority document is incorporated by reference herein.

BACKGROUND OF THE INVENTION

1. Field of the Invention

The present invention relates to a brake system for a vehicle, comprising a hydraulic pressure generating device for outputting a hydraulic pressure corresponding to a braking operation by a vehicle driver and hydraulic pressure operated wheel brakes mounted on wheels so as to be operated based on the hydraulic pressure output from the hydraulic pressure generating device. The brake system includes an electrically operated parking brake drive device which generates an operating force for operating the wheel brakes, or dedicated parking brakes mounted on wheels separately from the wheel brakes, in response to energization thereof, and which can be maintained in an operated state even upon cancellation of the energization while in the operated state. The brake system also includes a controller for controlling the energization of the electrically operated parking brake drive device.

2. Description of the Background Art

Japanese Patent No. 3595249 discloses a brake system for a vehicle in which when the shift position of the vehicle has been set at a parking position, when the vehicle is stopped on a slope, or when a driver manually operates an operating switch, the state of the vehicle is changed to a parking brake state by the operation of electrically operated parking brake drive device.

When the electrically operated parking brake drive device is operated, noise is generated and electric power is consumed by this operation. In the case where the electrically operated parking brake drive device is operated when the vehicle is stopped on a slope as referred to above, the frequency of the operation is increased depending on a preset threshold value for determining whether or not the vehicle is on a slope, resulting in an increase in frequency of generation of the noise and an increase in amount of the consumed electric power, and leading to degradation in durability of the electrically operated parking brake drive device. As a result, the driver needs to change the shift position to the parking position and operate the operating switch, which are inconvenient operations for the driver.

SUMMARY

Accordingly, it is an object of the present invention to provide a brake system for a vehicle, wherein the frequency of operation of electrically operated parking brake drive device can be decreased, while eliminating the driver's inconvenient operation of the electrically operated parking brake drive device, thereby suppressing generation of noise caused by the operation and contributing to an enhancement in durability of the electrically operated parking brake drive device.

In order to achieve the above object, according to a first feature of the present invention, there is provided a brake system for a vehicle, comprising a hydraulic pressure generating device for outputting a hydraulic pressure corresponding to a braking operation by a vehicle driver and hydraulic pressure operated wheel brakes mounted on wheels so as to be operated based on the hydraulic pressure output from the hydraulic pressure generating device. The brake system includes an electrically operated parking brake drive device which generates an operating force for operating the wheel brakes, or dedicated parking brakes mounted on wheels separately from the wheel brakes, in response to energization of the electrically operated parking brake drive device, and which can be maintained in an operated state even upon cancellation of the energization while in the operated state. The brake system also includes a controller for controlling the energization of the electrically operated parking brake drive device, and a braking force related amount detector for detecting a physical quantity related to a braking force exhibited by each of the hydraulic pressure operated wheel brakes. The controller starts the energization of the electrically operated parking brake drive device when the physical quantity detected by the braking force related amount detector exceeds a reference value in a stopped state of the vehicle.

According to a second feature of the present invention, in addition to the first feature, the reference value is set to be larger than a value of physical quantity corresponding to a braking force required to maintain the vehicle in the stopped state.

According to a third feature of the present invention, in addition to the first or second feature, the system further includes a shift position determining device for determining whether or not a shift position of an automatic transmission mounted on the vehicle is a parking position. When the shift position determining device determines that the shift position is the parking position, the controller starts the energization of the electrically operated parking brake drive device based on a reference value set to be larger than that when the shift position is a non-parking position.

According to a fourth feature of the present invention, in addition to the second or third feature, the controller controls the energization and operation of the electrically operated parking brake drive device while determining a target operational amount so as to obtain a braking force required for maintaining the stopped state of the vehicle According to a fifth feature of the present invention, in addition to the first feature, the system further includes normally-open solenoid valves interposed between the hydraulic pressure generating device and the hydraulic pressure operated wheel brakes. The controller closes the solenoid valves when the physical quantity detected by the braking force related amount detector has decreased by an amount which exceeds a predetermined value. The predetermined value is preset as a value by which a brake-operating force can be determined to be cancelled within a period from the start of the operation of the electrically operated parking brake drive device until the operational amount of the electrically operated parking brake drive device reaches a target operational amount.

According to a sixth feature of the present invention, in addition to the fifth feature, the controller finishes the control of closing the solenoid valves when the operational amount of the electrically operated parking brake drive device reaches the target operational amount.

According to a seventh feature of the present invention, in addition to the fifth feature, the controller determines that the electrically operated parking brake drive device has broken down when the operational amount of the electrically operated parking brake drive device does not reach the target operational amount although a predetermined time has elapsed after the start of the operation of the electrically operated parking brake drive device. Upon determination of the breakdown, the controller carries out a process associated with the breakdown.

With the first feature of the present invention, the operation of the electrically operated parking brake drive device is started on condition that the vehicle is stopped and also when a braking force provided by a hydraulic pressure exceeds a predetermined braking force, thereby changing a state in which the braking force is provided by the hydraulic pressure to a parking brake state by the operation of the electrically operated parking brake drive device caused by the energization thereof. Therefore, it is possible to operate the electrically operated parking brake drive device, while eliminating the need for the driver to perform inconvenient operations; and also to decrease the frequency of the operation of the electrically operated parking brake device so as to enhance its durability, while reducing noise associated with its operation.

With the second feature of the present invention, the driver's intention to stop the vehicle is confirmed to operate the electrically operated parking brake drive device, thereby further decreasing the frequency of the operation of the electrically operated parking brake drive device.

With the third feature of the present invention, it is possible to avoid a situation in which the electrically operated parking brake drive device is unnecessarily operated in the non-parking state.

With the fourth feature of the present invention, the stopped state of the vehicle can be maintained by the electrically operated parking brake drive device.

With the fifth feature of the present invention, it is possible to avoid a situation in which the braking force provided by the hydraulic pressure is decreased within a period from the start of the operation until the operational mount of the electrically operated parking brake drive device reaches a target operational amount; and thus it is possible to reliably prevent an undesired movement of the vehicle which is not intended by the driver, before the stopped state of the vehicle is maintained by the operation of the electrically operated parking brake drive device.

With the sixth feature of the present invention, by confirming that a sufficient braking force is being provided by the operation of the electrically operated parking brake drive device, the control of the solenoid valves can be finished to cancel the braking force provided by the hydraulic pressure.

With the seventh feature of the present invention, it can be determined that the electrically operated parking brake drive device has broken down when the operational amount of the electrically operated parking brake drive device does not reach the target operational amount although a predetermined time has elapsed after the start of the operation of the electrically operated parking brake drive device; and processing associated with the breakdown can be carried out based on the determination of the breakdown.

The above and other objects, features and advantages of the invention will become apparent from the following description of the preferred embodiment taken in conjunction with the accompanying drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art Referring first to FIG. 1, output from an automatic transmission T, connected in series to an engine E, is transmitted to a left front wheel WA and a right front wheel WC, which are driven wheels of a front-engine front-drive (FF) vehicle V. A left front wheel brake 2A and a right front wheel brake 2C, which are disk brakes, are mounted on the front wheels WA and WC. In addition, a right rear wheel brake 2B and a left rear wheel brake 2D, which are disk brakes, are mounted on a right rear wheel WB and a left rear wheel WD.

Figure 1:
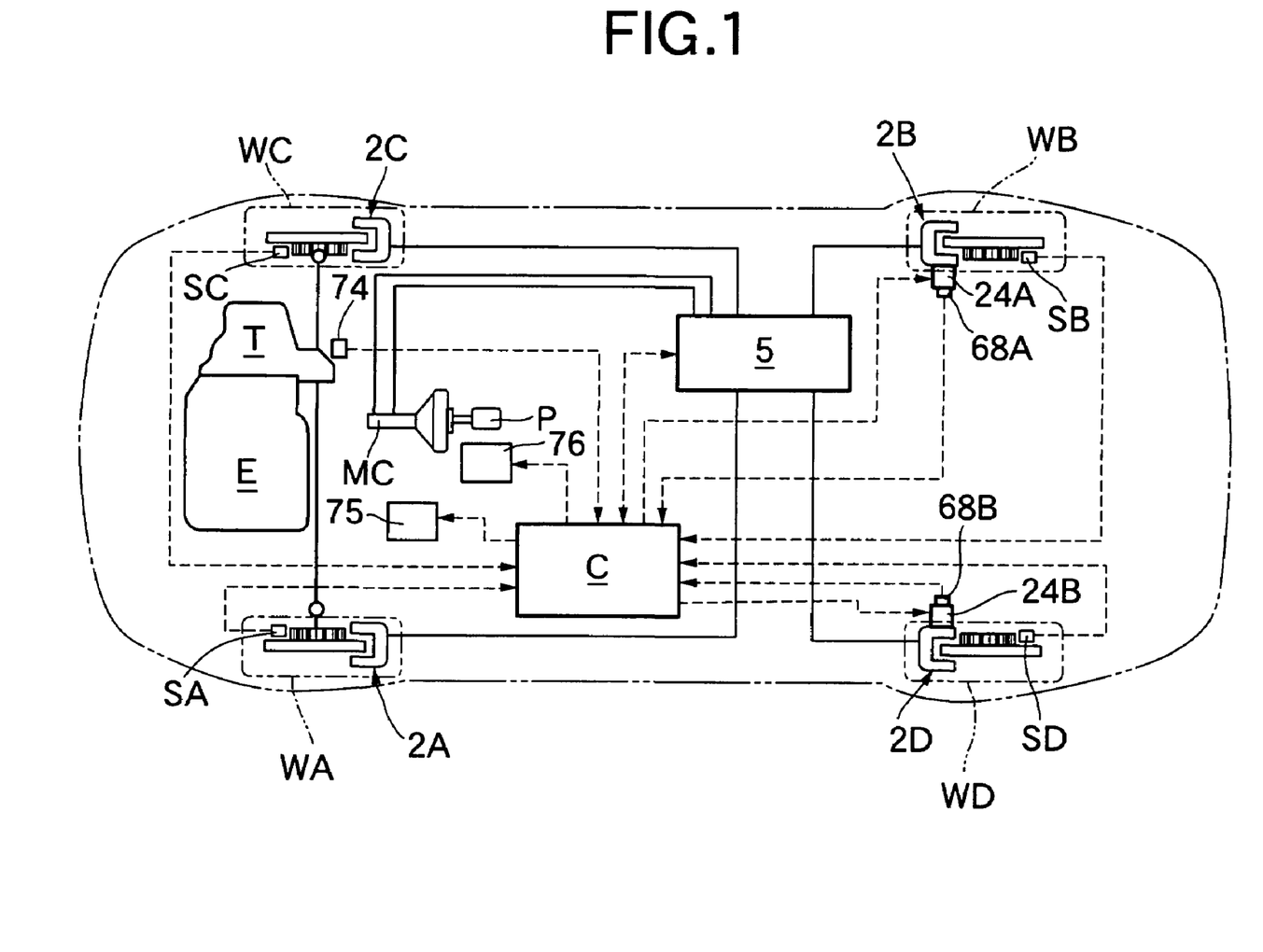
FIG. 1 is an illustration showing the entire arrangement of a drive system and a brake system of a vehicle.

A master cylinder MC serves as a hydraulic pressure generating device adapted to output a braking hydraulic pressure in response to the operation of a brake pedal P by a vehicle driver. The master cylinder MC is of a tandem type, and is connected to the wheel brakes 2A to 2D through a hydraulic pressure control circuit 5.

Figure 2:
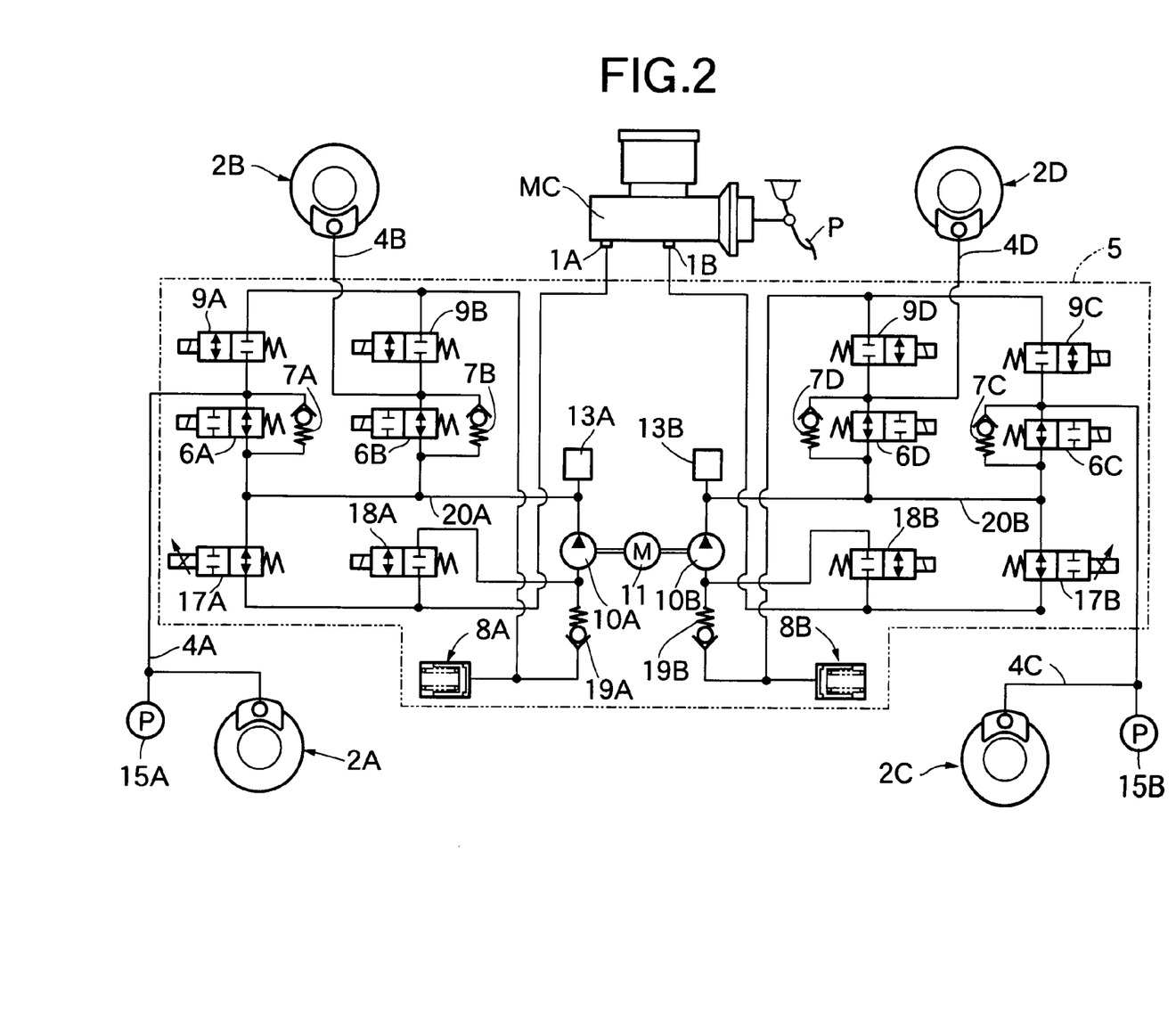
FIG. 2 is a schematic drawing showing the arrangement of a hydraulic pressure control circuit.

Referring to FIG. 2, the master cylinder MC includes first and second output ports 1A and 1B for outputting a hydraulic pressure depending on the operation of the brake pedal P by the driver. The first and second output ports 1A and 1B are connected to the wheel brakes 2A to 2D through the hydraulic pressure control circuit 5.

The hydraulic pressure control circuit 5 includes a first hydraulic pressure passage 20A capable of connection to the first output port 1A and a second hydraulic pressure passage 20B capable of connection to the first output port 1B. The hydraulic pressure control circuit 5 includes first and second pressure regulating valves 17A and 17B interposed between the first and second output ports 1A and 1B and the first and second hydraulic pressure passages 20A and 20B, respectively. The hydraulic pressure control circuit 5 includes a normally-open solenoid valve 6A interposed between a wheel-brake-side hydraulic pressure passage 4A connected to the left front wheel brake 2A and the first hydraulic pressure passage 20A, a normally-open solenoid valve 6B interposed between a wheel-brake-side hydraulic pressure passage 4B connected to the right rear wheel brake 2B and the first hydraulic pressure passage 20A, a normally-open solenoid valve 6C interposed between a wheel-brake-side hydraulic pressure passage 4C connected to the right front wheel brake 2C and the second hydraulic pressure passage 20B, and a normally-open solenoid valve 6D interposed between a wheel brake-side hydraulic pressure passage 4D connected to the left rear wheel brake 2D and the second hydraulic pressure passage 20B. The hydraulic pressure control circuit 5 also includes check valves 7A to 7D connected in parallel to the normally-open solenoid valves 6A to 6D, respectively.

Also included in the hydraulic pressure control circuit 5 are first reservoirs 8A and 8B individually corresponding to the first and second output ports 1A and 1B, normally-closed solenoid valves 9A and 9B interposed between the first reservoir 8A and the wheel-brake-side hydraulic pressure passages 4A and 4B, respectively, and normally-closed solenoid valves 9C and 9D interposed between the second reservoir 8B and the wheel brake-side hydraulic pressure passages 4C and 4D, respectively. First and second pumps 10A and 10B are driven by a common electric motor 11 and are connected at their discharge sides to the first and second hydraulic pressure passages 20A and 20B, respectively. One-way valves 19A and 19B are interposed between the first and second reservoirs 8A and 8B and intake sides of the first and second pumps 10A and 10B, respectively. In addition, first and second suction valves 18A and 18B are interposed between the first and second output ports 1A and 1B and the intake sides of the first and second pumps 10A and 10B, respectively, and first and second dampers 13A and 13B are connected to the first and second hydraulic pressure passages 20A and 20B as well as discharge sides of the first and second pumps 10A and 10B, respectively.

The wheel-brake-side hydraulic pressure passages 4A and 4C are provided with brake hydraulic pressure sensors 15A and 15B for detecting braking hydraulic pressures applied to the left front wheel brake 2A and the right front wheel brake 2C. For example, brake hydraulic pressure sensors 15A and 15B detect hydraulic pressures in the first and second hydraulic pressure passages 20A and 20B in a usual service braking state in which the pressure regulating valves 17A and 17B and the normally-open solenoid valves 20A and 20B are open.

Each of the pressure regulating valves 17A and 17B is a normally-open linear solenoid valve and capable of switching the connection and disconnection between the first and second output ports 1A and 1B and the first and second hydraulic pressure passages 20A and 20B, respectively, and also capable of being operated to regulate the hydraulic pressures in the first and second hydraulic pressure passages 20A and 20B, respectively.

Thus, by operating the electric motor 11 when the first and second suction valves 18A and 18B are excited and opened, the first and second pumps 10A and 10B discharge the braking liquid, which has been drawn from the master cylinder MC and pressurized, into the first and second hydraulic pressure passages 20A and 20B. In this case, the hydraulic pressures in the first and second hydraulic pressure passages 20A and 20B can be maintained constant by controlling the operation of the pressure regulating valves 17A and 17B in accordance with the braking hydraulic pressures detected by the braking hydraulic pressure sensors 15A and 15B.

Namely, the first and second pumps 10A and 10B, as well as the pressure regulating valves 17A and 17B, apply constant hydraulic pressures to the first and second hydraulic pressure passages 20A and 20B during a non-braking operation. In addition, mutually different braking hydraulic pressures can be applied to the wheel brakes 2A to 2D by controlling the constant hydraulic pressures in the first and second hydraulic pressure passages 20A and 20B by the normally-open solenoid valves 6A to 6D and the normally-closed solenoid valves 9A to 9D, thereby carrying out automatic brake controls such as behavior stabilizing control and traction control during vehicle travel.

During service-braking, the first and second pressure regulating valves 17A and 17B are opened, and the first and second suction valves 18A and 18B are closed. The antilock brake control, which corresponds to a wheel having a possibility of entering a locked-state during service-braking, is carried out to control the opening and closing of any of the normally-open solenoid valves 6A to 6D and the normally-closed solenoid valves 9A to 9D, whereby the wheel can be braked with a good efficiency without being locked.

Figure 3:
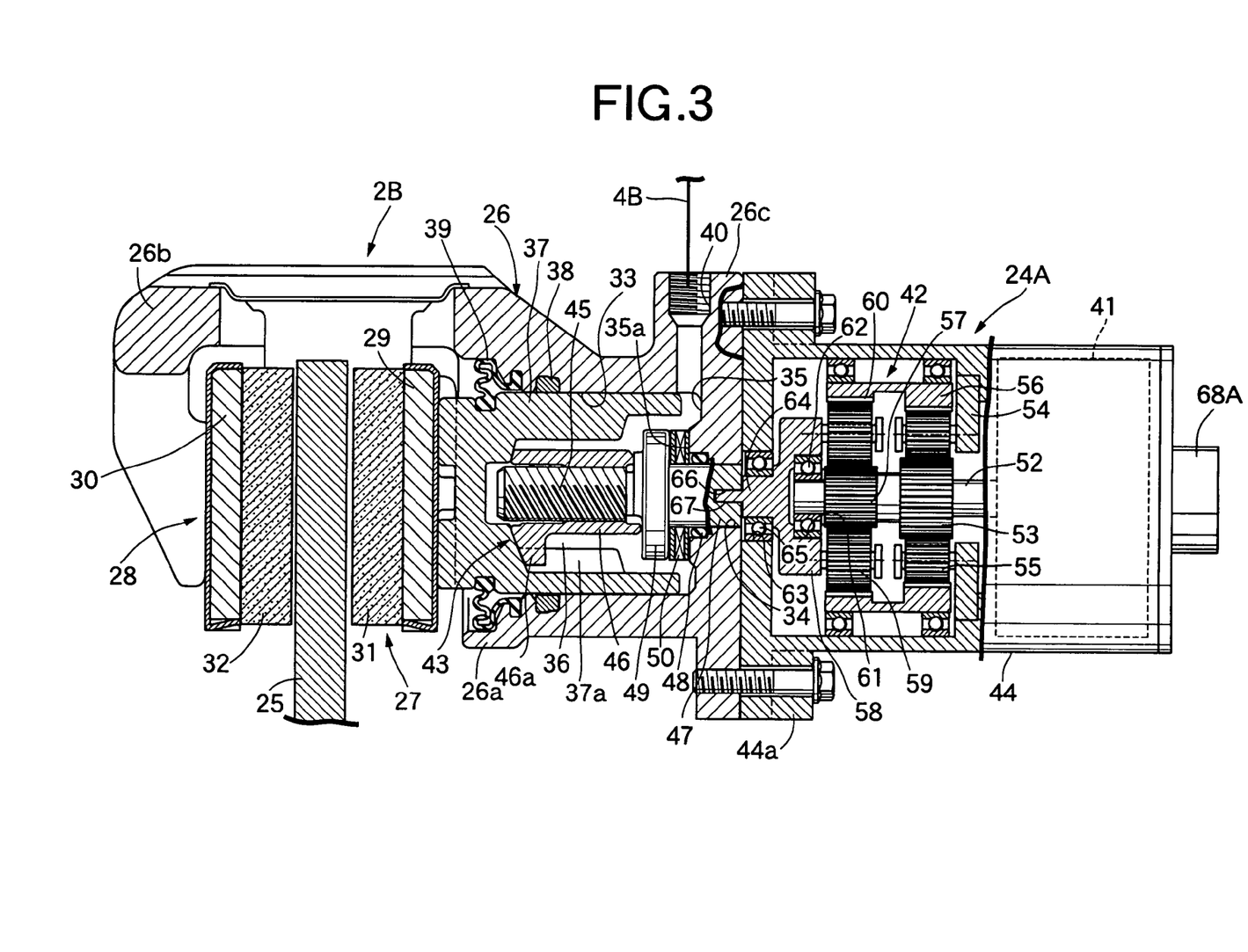
FIG. 3 is a vertical sectional view of a disk brake to which an electrically operated parking brake drive device is mounted.

Referring to FIG. 3, the right rear wheel brake 2B, which is a disk brake, is mounted on the right rear wheel WB, and includes: a disk rotor 25 which rotates along with a wheel rim (not shown) of the wheel; a caliper body 26; and a pair of left and right friction pads 27 and 28 disposed between the disk rotor 25 and the caliper body 26 to face opposite sides of the disk rotor 25.

The caliper body 26 includes a main body portion 26a and an arm portion 26b. The main body portion 26a is formed into a bottomed cylindrical shape so as to have an axis parallel to an axis of the disk rotor 25, and is supported at a support portion located on a vehicle body (not shown) for sliding movement in a direction along the axis of the disk rotor 25. The arm portion 26b extends from the main body portion 26a to the opposite side of the disk rotor 25 so as to be arranged astride the disk rotor 25. The friction pad 27 is opposed to one side of the disk rotor 25, is disposed on the side of the main body portion 26a relative to the disk rotor 25, and comprises a lining 31 provided on a back plate 29 which comes into sliding contact with the disk rotor 25 so as to be able to exhibit a frictional force thereon. The friction pad 28 is opposed to the other side of the disk rotor 25, is disposed on the side of the arm portion 26b relative to the disk rotor 25, and comprises a lining 32 provided on a back plate 30 which comes into sliding contact with the disk rotor 25 so as to be able to exhibit a frictional force thereon.

The main body portion 26a of the caliper body 26 has a cylinder bore 33 provided therein to open at one end thereof toward the friction pad 27. The main body portion 26a also has a through-bore 34 formed therein at a diameter smaller than that of the cylinder bore 33 to form an annular step 35 between the through-bore 34 and the other end of the cylinder bore 33. The cylinder bore 33 and the through-bore 34 are provided coaxially with each other, and have axes parallel to the disk rotor 25.

A bottomed cylindrical brake piston 37 closed at its front end is axially slidably received in the cylinder bore 33 to form a hydraulic pressure chamber 36 between the piston 37 and the step 35, so that its front end abuts against the back plate 29 of the one friction pad 27. An annular piston seal 38 is mounted on an inner surface of the cylinder bore 33 so as to be interposed between the caliper body 26 and the brake piston 37. An annular dust boot 39 is mounted between the open end of the cylinder bore 33 and the brake piston 37. An input port 40 is provided in the main body portion 26a and communicates with the hydraulic pressure chamber 36, and the wheel brake-side hydraulic pressure passage 4B is connected to the input port 40.

Thus, the brake piston 37 is advanced toward the disk rotor 25 as the hydraulic pressure is transferred from the wheel brake-side hydraulic pressure passage 4B through the input port 40 into the hydraulic pressure chamber 36, and correspondingly a braking force is applied to the disk rotor 25, i.e., to the right rear wheel WB.

Attached to the right rear wheel brake 2B is an electrically-operated parking brake drive device 24A capable of providing an operating force for operating the wheel brake 2B in response to energization. The electrically-operated parking brake drive device 24A is arranged so that an output from an electric motor 41 is transmitted to the brake piston 37 through a deceleration mechanism 42 and a screw mechanism 43.

The screw mechanism 43 is accommodated within the main body portion 26a of the caliper body 26. The deceleration mechanism 42 and the electric motor 41 are accommodated within a housing 44 having a flange 44a coupled to a flange 26c provided on the main body portion 26a.

The screw mechanism 43 includes: a screw shaft 45 coaxial with the cylinder bore 33; a nut 46 relatively non-rotatably engaged with the brake piston 37 and threadedly engaged with the screw shaft 45; and a spindle 47 coaxially and integrally connected to a rear end of the screw shaft 45 on a side opposite from the brake piston 37.

The screw shaft 45 is threadedly engaged with the cylindrical nut 46, the nut 46 surrounding the screw shaft 45 within the brake piston 37. A front end of the nut 46 abuts against an inner surface of a front end of the brake piston 37. A plurality of projections 46a protruding sideways from the front end of the nut 46 are engaged with a plurality of locking portions 37a provided on the inner surface of the brake piston 37 at locations near its front end. The nut 46 is relatively non-rotatably engaged with the brake piston 37.

The spindle 47 passes through the through-bore 34 in the main body portion 6a and rotates therein. An O-ring 48 is interposed between the spindle 47 and the main body portion 6a. Further, a collar 49 is integrally provided at a connection between the spindle 47 and the screw shaft 45 so as to protrude radially outwards. A thrust bearing 50 is interposed between the collar 49 and an annular receiving seat 35a formed at a central portion of the step 35.

The deceleration mechanism 42 is of a 2-stage planetary gear type interposed between the electric motor 41 and the spindle 47, and the electric motor 41 and the deceleration mechanism 42 are disposed coaxially with the spindle 47. The deceleration mechanism 42 includes: an input-side sun gear 53 coaxially connected to the electric motor 41; a plurality of input-side planetary gears 55 which are rotatably carried on an input-side gear carrier 54 fixed to the housing 44, and which are meshed with the input-side sun gear 53; an input-side internal gear 56 meshed with the input-side planetary gears 55; an output-side sun gear 57 rotated integrally with the input-side sun gear 53; a plurality of output-side planetary gears 59 which are rotatably carried on an output-side planetary gear carrier 58 disengageably and coaxially engaged with the spindle 47, and which are meshed with the output-side sun gear 57; and an output-side internal gear 60 meshed with the output-side planetary gears 59 and rotated integrally with the input-side internal gear 56.

The input-side and output-side internal gears 56 and 60 are coaxially and integrally coupled with each other and carried in the housing 44. The input-side sun gear 53 and the output-side sun gear 57 are provided on a rotating shaft 52 coaxially connected at one end thereof to the electric motor 41. The other end of the rotating shaft 52 is thrust into a recess 61 provided in the output-side planetary gear carrier 58 which is an output member of the deceleration mechanism 42. A ball bearing 62 is interposed between an inner periphery of the recess 61 and the rotting shaft 52. A support bore 63 coaxial with the spindle 47 is provided in an end wall of the housing 44 on the side of the main body portion 6a. A ball bearing 65 is interposed between the housing 44 and a connecting shaft 64 which is integrally provided on the output-side planetary gear carrier 58 on a side opposite from the recess 61. The ball bearing 65 and the connecting shaft 64 are coaxially inserted through the support bore 63.

In the deceleration mechanism of such a two-stage planetary gear type, if the number of teeth of the input-side sun gear 53 is represented by ZA, that of the input-side planetary gear 55 is represented by ZB, that of teeth of the input-side internal gear 56 is represented by ZC, that of the output-side sun gear 57 is represented by ZD, that of the output-side planetary gear 59 is represented by ZE, and that of the output-side internal gear 60 is represented by ZF, a reduction ratio U is determined according to the following equation:

$$U=\{ZA \cdot ZF - ZD \cdot ZC\}/\{ZC \cdot (ZD+ZF)\}$$

A non-circular locking recess 66 is provided in a rear end face of the spindle 47 included in the screw mechanism 43. An engaging projection 67 is integrally projectingly provided at a front end of the connecting shaft 64 included in the output-side planetary gear carrier 58 of the deceleration mechanism 42 so that the engaging projection 67 is engaged in the locking recess 66 while preventing the relative rotation of the spindle 47 and the output-side planetary gear carrier 58 in its engaged state.

Thus, the output from the electric motor 41 is transmitted to the spindle 47 through the speed reduction in the deceleration mechanism 42, thereby rotating the screw shaft 45 of the screw mechanism 43. The disk rotor 25 is clamped from opposed sides between the friction pads 27 and 28 by the action and the reaction caused by the axial sliding of the brake piston 37 when the rotations of the brake piston 37 and the nut 46 are inhibited, thereby providing a braking force.

An operational amount detector 68A is attached to the electric motor 41 for detecting an operational amount of the electric motor 41, that is, an operational amount of the electrically operated parking brake drive device 24A.

The screw mechanism 43 is constructed to be a non-self-locking type which is capable of causing the friction pads 27 and 28 to move away from the disk rotor 25 by the reaction from the disk rotor 25 when the screw mechanism 43 is disconnected from the deceleration mechanism 42. On the other hand, the deceleration mechanism 42 is constructed into a self-locking type such that the operated state of the screw mechanism 43 can be maintained even in a non-energized state of the electric motor 41 when the deceleration mechanism 42 is connected to the screw mechanism 43. Namely, the electrically operated parking brake drive device 24A is capable of generating an operating force for operating the right rear wheel brake 2B in response to an energization thereof, and of maintaining the operated state even upon the cancellation of the energization while in the operated state.

The left rear wheel brake 2D is constructed in a manner similar to the above-described right rear wheel brake 2B, and an electrically operated parking brake drive device 24B (see FIG. 1), constructed in a manner similar to the electrically operated parking brake drive device 24A, is attached to the left rear wheel brake 2D. An operational amount detector 68B (see FIG. 1) is attached to the electrically operated parking brake drive device 24B for detecting an operational amount of the electrically operated parking brake drive device 24B.

Figure 4:
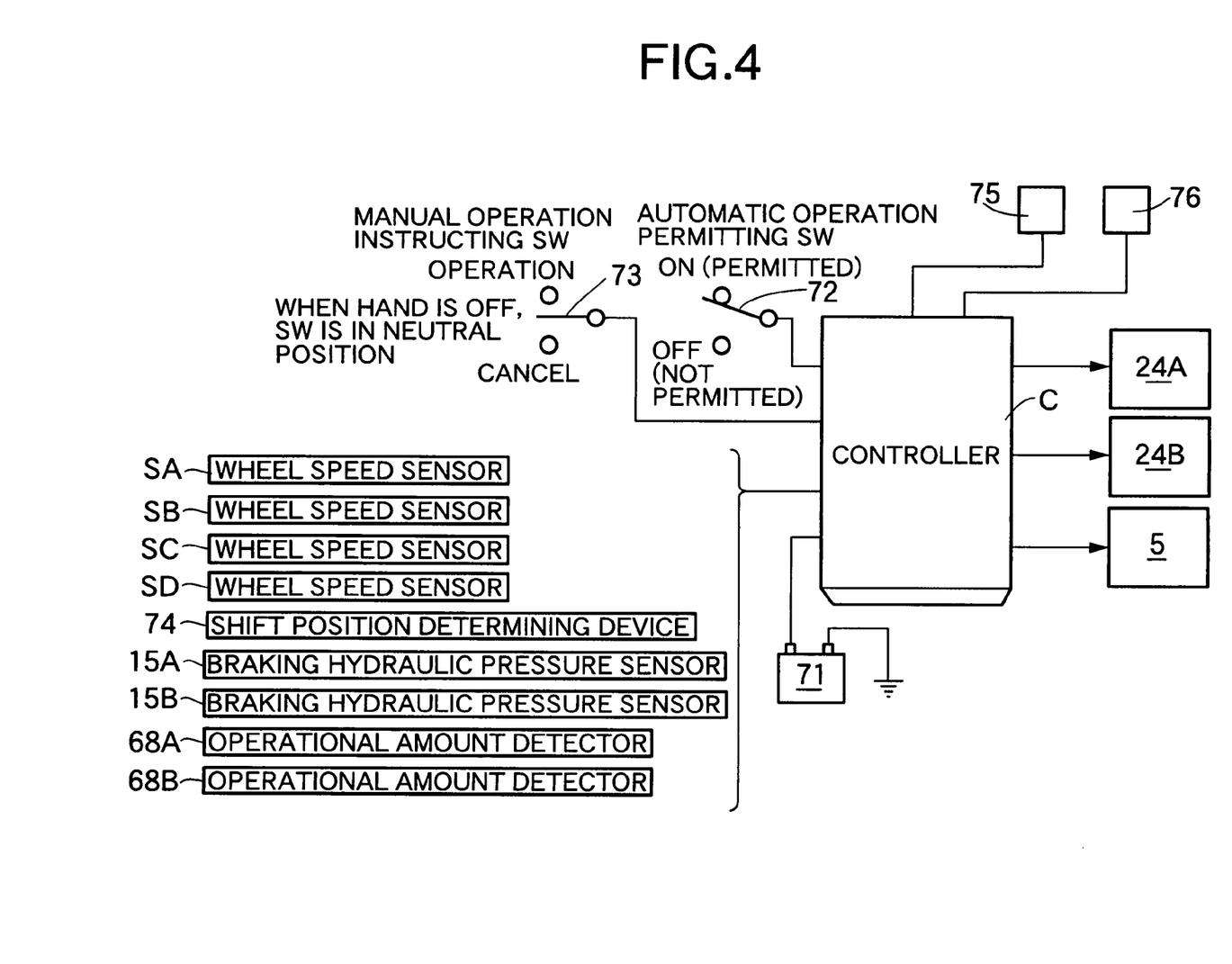
FIG. 4 is a block diagram showing the arrangement of a brake control system.

Referring to FIG. 4, a controller C receives electric current supply from a battery 71 and controls the operations of the hydraulic pressure control circuit 5 and the electrically operated parking brake drive device 24A and 24B. Signals are input into the controller C from the following members: an automatic operation permitting switch 72 which permits switching between permission and non-permission of the automatic operations of the electrically operated parking brake drive device 24A and 24B; a manual operation instructing switch 73 which permits instruction by a manual operation the braking operation of the electrically operated parking brake drive device 24A and 24B and the cancellation of the braking operation; wheel speed sensors SA, SB, SC and SD which detect wheel speeds of the left front wheel WA, the right rear wheel WB, the right front wheel WC and the left rear wheel WD, respectively; a shift position determining device 74 which determines whether or not the shift position of the automatic transmission T is a parking position; the braking hydraulic pressure sensors 15A and 15B which detect braking hydraulic pressures of the service braking; and the operational amount detectors 68A and 68B which detect the operational amounts of the electrically operated parking brake drive device 24A and 24B. Based on these signals, the controller C controls the operations of the hydraulic pressure control circuit 5, the electrically operated parking brake drive device 24A and 24B, an operation lamp 75 for indicating to a vehicle driver the operated states of the electrically operated parking brake drive device 24A and 24B, and an alarm lamp 76.

The manual operation instructing switch 73 is a 3-position changeover switch of a self-restored type, and is always in a neutral position when a driver's hand has been released from the switch. Only when the manual operation instructing switch 73 is operated to an operating position or a cancellation position, a signal indicative of the operation or the cancellation is outputted. The automatic operation permitting switch 72 is a switch of a 2-position changeover type and is adapted to be selectively switched to an automatic operation permitting position or an automatic operation non-permitting position.

The following is the description of a parking control carried out by the controller C when the automatic operation has been permitted by the automatic operation permitting switch 72. When the vehicle can be determined as having been stopped by the depression of the brake pedal P by the vehicle driver based on values detected by the wheel speed sensors SA to SD, and when values detected by the braking hydraulic pressure sensors 15A and 15B for detecting braking hydraulic pressures, which are physical quantities related to braking forces exhibited by the right rear wheel brake 2B and the left rear wheel brake 2D, have exceeded a reference value, the controller C starts to energize the electrically operated parking brake drive device 24A and 24B to operate the electrically operated parking brake drive device 24A and 24B, and turns on the operation lamp 75 in order to notify the vehicle driver of that the electrically operated parking brake drive device 24A and 24B are in operation.

The reference value is set to be larger than the physical quantity, i.e., the braking hydraulic pressure corresponding to a braking force, required to maintain the vehicle in a stopped state. The braking pressure required to maintain the vehicle in the stopped state is varied in accordance with a gradient of a road surface, as shown in a dashed line in FIG. 5. In this embodiment, the reference value is set to be larger than the braking hydraulic pressure capable of maintaining the vehicle in the stopped state at a road surface gradient of 30%.

Further, when it has been determined by the shift position determining device 74 that the shift position of the automatic transmission T is the parking position, the controller C determines to start the energization of the electrically operated parking brake drive device 24A and 24B based on the reference value set at a larger value as compared with a value when the shift position is in a non-parking position. In this embodiment, the reference value when the shift position is in the non-parking position is, for example, 5 MPa as shown by a first straight line L1 in FIG. 5, while the reference value when the shift position is in the parking position is, for example, 6 MPa as shown by a second straight line L2 in FIG. 5.

Moreover, the controller C determines a target operational amount so that the braking force required to maintain the vehicle in the stopped state can be obtained, and controls the energization and operation of the electrically operated parking brake drive device 24A and 24B. Specifically, the controller C controls the energization and operation of the electrically operated parking brake drive device 24A and 24B so that the operational amount detected by the operational amount detectors 68A and 68B reaches the target operational amount, and when the operational amount of the electrically operated parking brake drive device 24A and 24B has reached the target operational amount, the operation of the electrically operated parking brake drive device 24A and 24B is stopped, and the operation lamp 75 is turned off.

Figure 5:
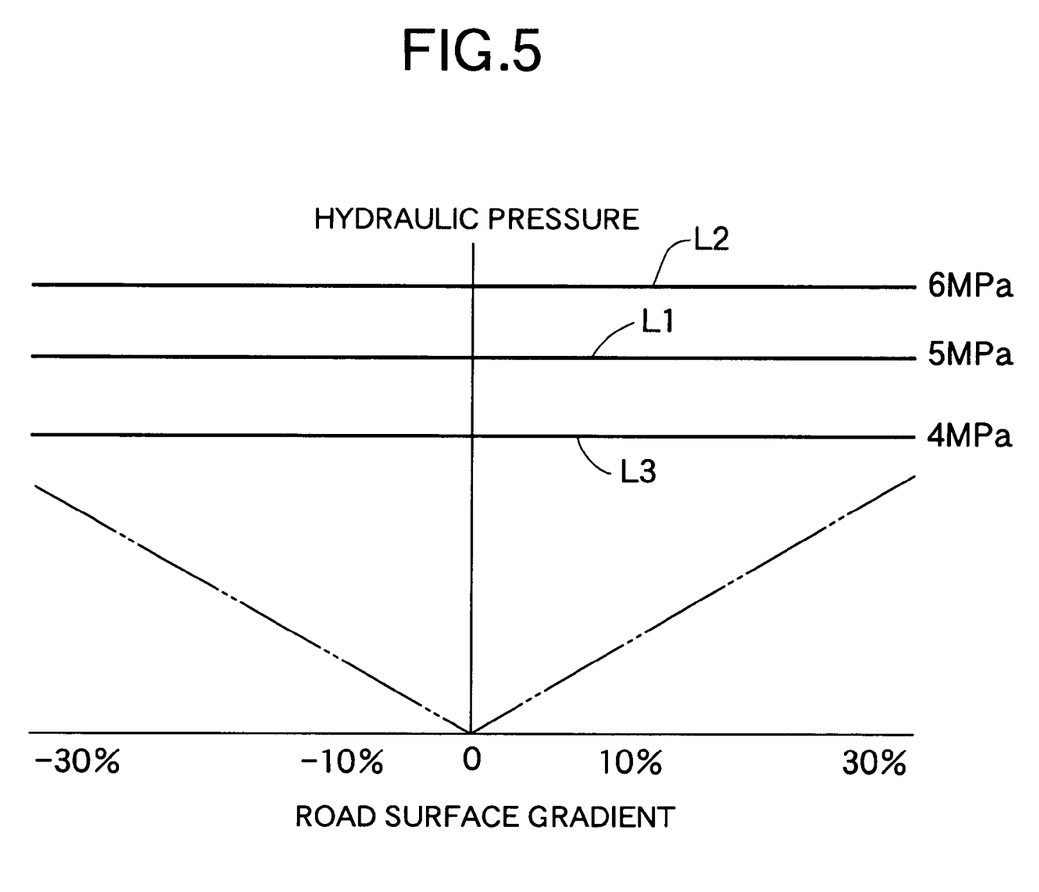
FIG. 5 is a graph showing a preset map for reference values and target operational amount values of the electrically operated parking brake drive device corresponding to hydraulic pressures.

The target operational amount for the electrically operated parking brake drive device 24A and 24B is determined so that a braking force corresponding to a braking force given for the entire vehicle when the braking hydraulic pressures applied to the left front wheel brake 2A, the right front wheel brake 2C, the right rear wheel brake 2B and the left rear wheel brake 2D are represented by a third straight line L3 in FIG. 5 can be provided by the operations of the right rear wheel brake 2B and the left rear wheel brake 2D caused by the operations of the electrically operated parking brake drive device 24A and 24B. The third straight line L3 is, for example, 4 MPa.

When the braking hydraulic pressures detected by the braking hydraulic pressure sensors 15A and 15B have decreased by an amount which exceeds a predetermined value (for example, 0.5 MPa) preset as a value by which the brake-operating force can be determined as being cancelled, within a period from the start of the operation of electrically operated parking brake drive device 24A and 24B until the operational amount of the electrically operated parking brake drive device 24A and 24B reaches the target operational amount, the controller C controls as follows. The controller C closes the pressure regulating valves 17A and 17B, which are the normally-open solenoid valves interposed between the left front wheel brake 2A as well as the right rear wheel brake 2B and the master cylinder MC and between the right front wheel brake 2C as well as the left rear wheel brake 2D and the master cylinder MC, respectively, in order to maintain the hydraulic pressures applied to the four wheel brakes 2A to 2D (see Time Point t2 in FIGS. 7 and 8 which will be described later).

In addition, when the operational amount of the electrically operated parking brake drive device 24A and 24B reaches the target operational amount, the controller C finishes the closing control of the pressure regulating valves 17A and 17B.

Further, when the operational amount of the electrically operated parking brake drive device 24A and 24B does not reach the target operational amount although a predetermined time (e.g., 3 seconds) has lapsed after the start of operation of these device 24A and 24B, the controller C determines that the electrically operated parking brake drive device 24A and 24B has broken down; and then carries out processing for the breakdown. In this processing for the breakdown, the energization of the electrically operated parking brake drive device 24A and 24B is stopped, the alarm lamp 76 is turned on, and the pressure regulating valves 17A and 17B are opened if the hydraulic pressure-maintained state is being provided by the closing control of the pressure regulating valves 17A and 17B.

Figure 6:
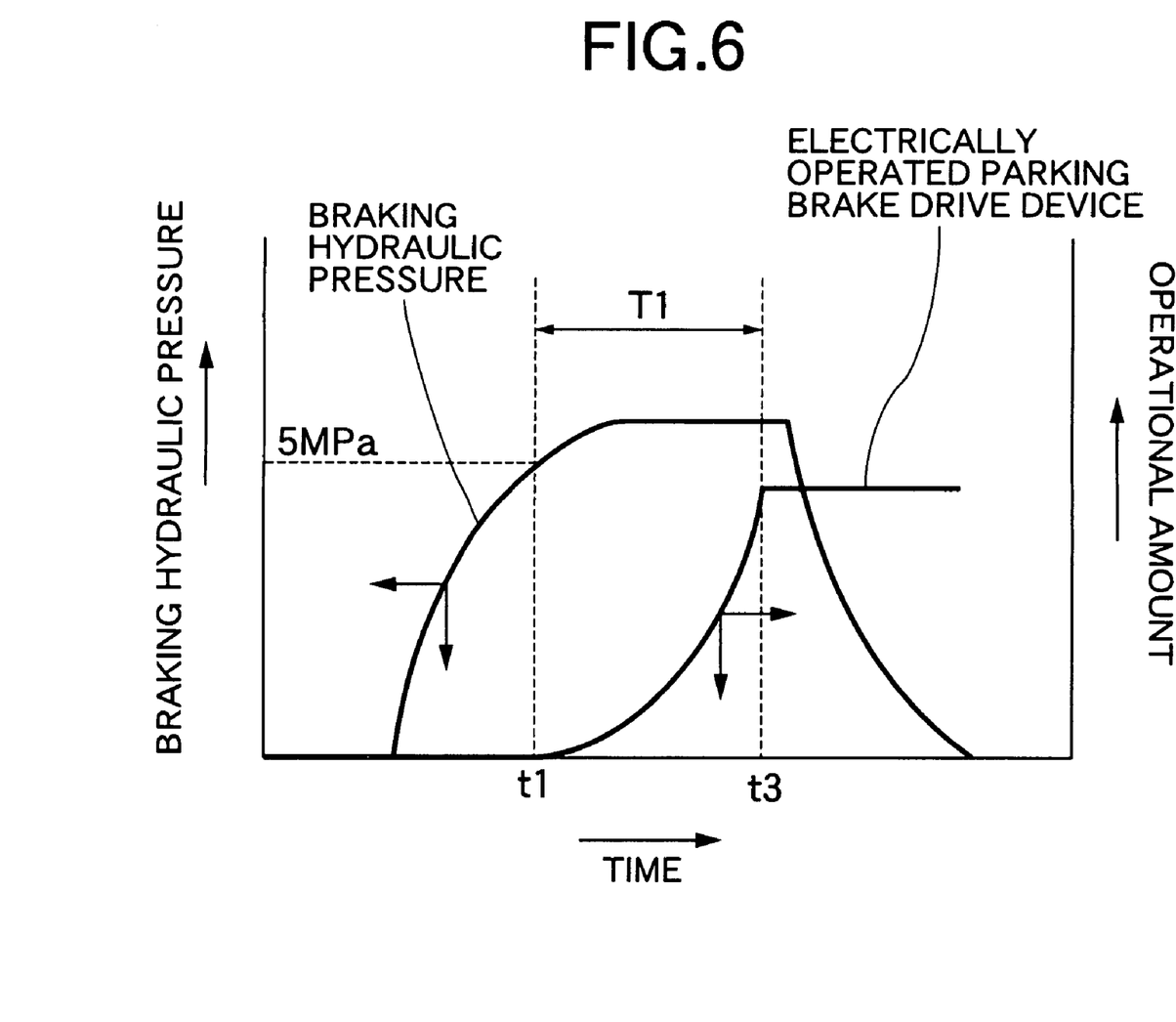
FIG. 6 is a graph showing variations in braking hydraulic pressure and in operational amount of the electrically operated parking brake drive device during stoppage of the vehicle.

The operation of this embodiment will be described below. The values detected by the braking hydraulic pressure sensors 15A and 15B, which detect the braking hydraulic pressures, are physical quantities related to the braking forces exhibited by the right rear wheel brake 2B and the left rear wheel brake 2D based on the hydraulic pressure output from the master cylinder MC. When the values detected by the braking hydraulic pressure sensors 15A and 15B exceed the reference value in the stopped state of the vehicle, the controller C starts the energization of the electrically operated parking brake drive device 24A and 24B. For example, when the shift position of the automatic transmission T is the non-parking position, the operation of the electrically operated parking brake drive device 24A and 24B is started at Time Point t1 at which the braking hydraulic pressure exceeds, for example, 5 MPa, as shown in FIG. 6.

On condition that the vehicle is in the stopped state and the braking force exceeds a predetermined braking force as described above, the operation of the electrically operated parking brake drive device 24A and 24B is started, thereby changing from a state in which the braking force is provided by the hydraulic pressure to a parking braked state achieved by the operation of the electrically operated parking brake drive device 24A and 24B, caused by the energization thereof. Therefore, it is possible to operate the electrically operated parking brake drive device 24A and 24B, while eliminating the inconvenient operation carried out by the driver to decrease the frequency of the operation, thereby enhancing the durability of the electrically operated parking brake drive device, while suppressing the generation of noise.

Further, the reference value for determining the start of the energization of the electrically operated parking brake drive device 24A and 24B is set to be larger than a braking pressure corresponding to a braking force required to maintain the vehicle in the stopped state, and hence the frequency of the operation of the electrically operated parking brake drive device 24A and 24B can be decreased in such a manner that a driver's intention to stop the vehicle is confirmed to operate the electrically operated parking brake drive device 24A and 24B.

Furthermore, the controller C determines the target operational amount to provide the braking force required to maintain the stopped state of the vehicle, and controls the energization and operation of the electrically operated parking brake drive device 24A and 24B. Specifically, the energization of the electrically operated parking brake drive device 24A and 24B is stopped at Time Point t3 at which the operational amount of the electrically operated parking brake drive device 24A and 24B reaches the target operational amount after elapse of Time Period T1 (for example, 1 second) from Time Point t1. Therefore, it is possible to reliably maintain the stopped state of the vehicle by the electrically operated parking brake drive device 24A and 24B.

When it is determined by the shift position determining device 74 that the shift position of the automatic transmission T is the parking position, the controller C determines to start the energization of the electrically operated parking brake drive device 24A and 24B, based on the reference value set at the value larger than that when the shift position is the non-parking position, thereby avoiding a situation in which the electrically operated parking brake drive devices 24A and 24B are unnecessarily operated in the non-parking position.

Figure 7:
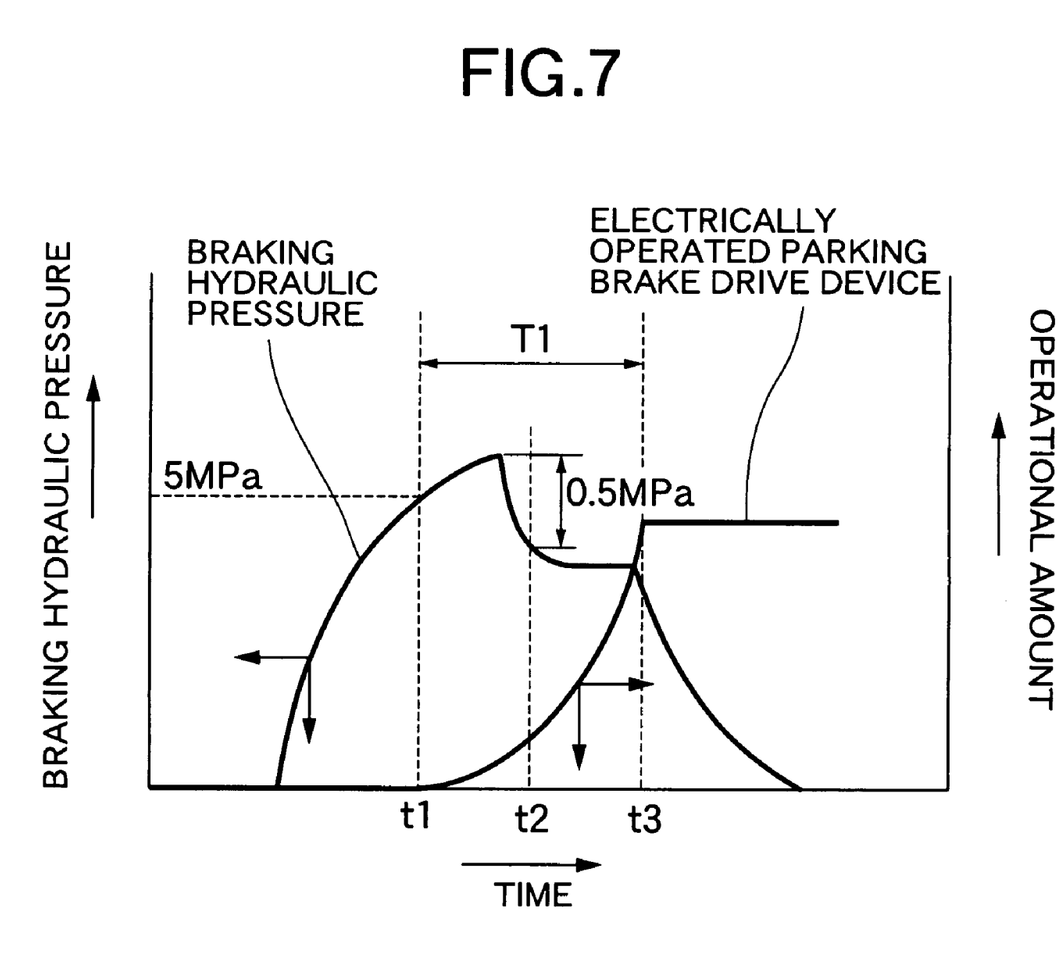
FIG. 7 is a graph similar to FIG. 6, but relates to the case where a brake operating force is cancelled midway in a braking process.

As shown in FIG. 7, the controller C controls and closes the pressure regulating valves 17A and 17B, interposed between the left front wheel brake 2A as well as the right rear wheel brake 2B and the master cylinder MC and between the right front wheel brake 2C as well as the left rear wheel brake 2D and the master cylinder MC, respectively, at Time Point t2. The Time point t2 is the time at which the hydraulic pressure detected by each of the braking hydraulic pressure sensors 15A and 15B has decreased by an amount which exceeds the predetermined value (for example, 0.5 MPa) preset as the value for determination of the cancel of the brake operating force, within a period from the start of the operation at Time Point t1 until the operational amount of the electrically operated parking brake drive device 24A and 24B reaches the target operational amount. Therefore, it is possible to avoid a situation in which the braking force provided by the hydraulic pressure is decreased within the period until the operational amount of the electrically operated parking brake drive device 24A and 24B reaches the target operational amount, and to reliably prevent the occurrence of an unintended movement of the vehicle before the stopped state of the vehicle is maintained by the operation of the electrically operated parking brake drive device 24A and 24B.

Further, since the controller C finishes the closing control of the pressure regulating valves 17A and 17B at Time Point t3 where the operational amount of the electrically operated parking brake drive device 24A and 24B reaches the target operational amount after elapse of Time Period T1 (for example, 1 second) from Time Point t1. Therefore, it is possible to confirm that a sufficient braking force has been obtained by the operation of the electrically operated parking brake drive device 24A and 24B, and then finish the control of the pressure regulating valves 17A and 17B.

Figure 8:
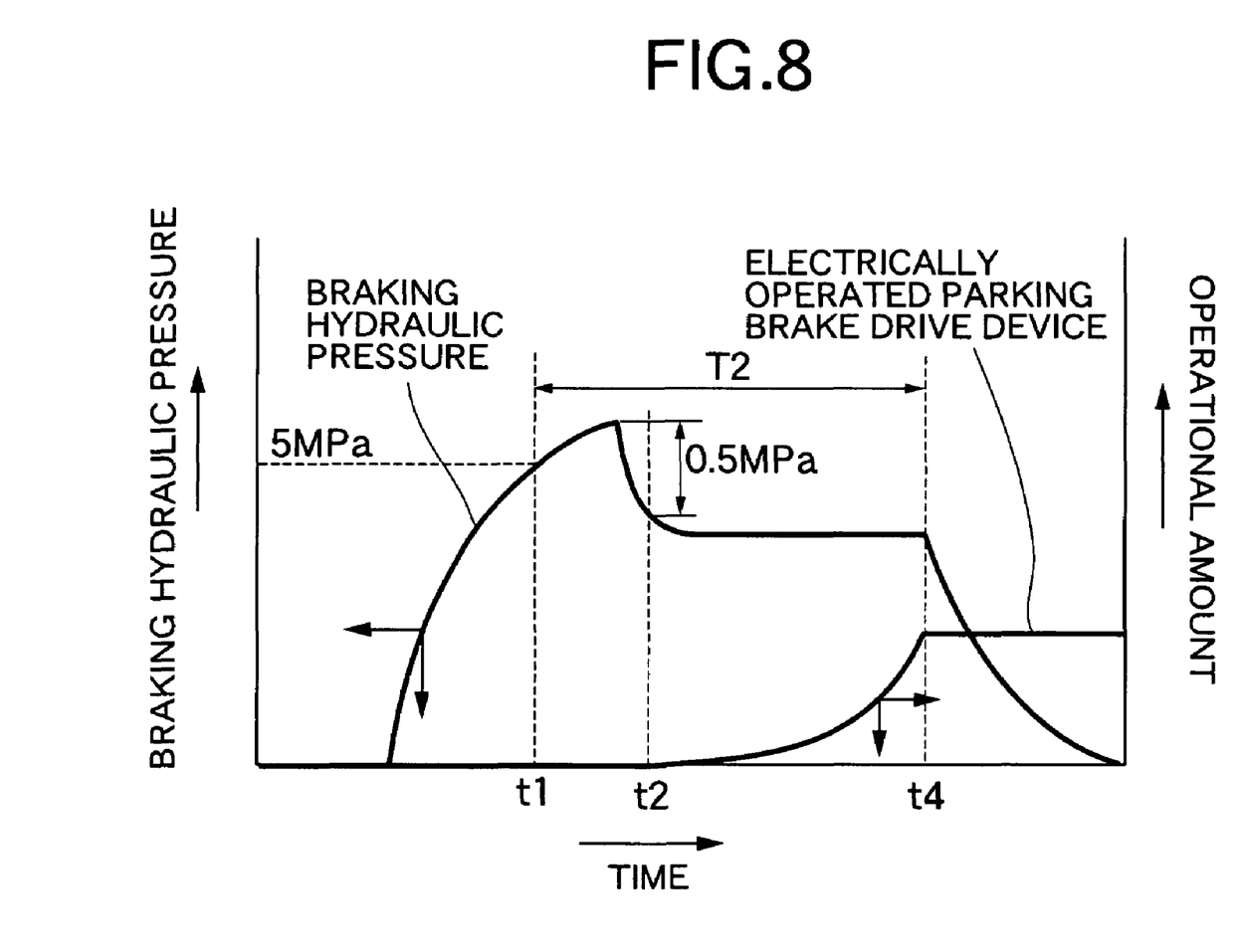
FIG. 8 is a diagram similar to FIGS. 6 and 7, but relates to the case where the electrically operated parking brake drive device has broken down.

Furthermore, when the operational amount of the electrically operated parking brake drive device 24A and 24B does not reach the target operational amount although a predetermined Time Period T2 (for example, 3 seconds) has elapsed after the start of the operation of the electrically operated parking brake drive device 24A and 24B, the controller C determines that the electrically operated parking brake drive devices 24A and 24B have broken down; and then carries out the processing for the breakdown. As shown in FIG. 8, the operation of the electrically operated parking brake drive device 24A and 24B is started at Time Point t1; the pressure regulating valves 17A and 17B are controlled to be closed at Time Point t2; and the controller C stops the energization of the electrically operated parking brake drive device 24A and 24B, turns on the alarm lamp 76, and opens the pressure regulating valves 17A and 17B at Time Point t4 where Time Period T2 has elapsed after Time Point t1.

When the operational amount of the electrically operated parking brake drive device 24A and 24B does not reach the target operational amount although the predetermined Time Period T2 has elapsed after the start of the operation of the electrically operated parking brake drive device 24A and 24B, it can be determined that the electrically operated parking brake drive devices 24A and 24B have broken down. Based on the determination of the breakdown, the process for the breakdown can be carried out.

Although the embodiment of the present invention has been described in detail, the present invention is not limited to the above-described embodiment, and various modifications in design may be made without departing from the scope of the invention defined in the claims.

For example, in the above-described embodiment, the present invention has been described for the case where the braking hydraulic pressure is used as the physical quantity related to the braking force, but an operating force or an operating stroke applied to the brake pedal P may be used as the physical quantity, and the start of the energization of the electrically operated parking brake drive devices 24A and 24B may be determined by a detection value detected by a depression force sensor or a stroke sensor.

In the above-described embodiment, the present invention has been described for the case where the electrically operated parking brake drive devices 24A and 24B are mounted to the right rear wheel brake 2B and the left rear wheel brake 2D of the hydraulic pressure-operated type, but the present invention is applicable to a system in which dedicated parking brakes separate from the wheel brakes of the hydraulic pressure-operated type are driven by the electrically operated parking brake drive device.

What is claimed is:

1. A brake system for a vehicle, comprising:
   a hydraulic pressure generating device which outputs a hydraulic pressure corresponding to a braking operation by a vehicle driver;
   hydraulic pressure operated wheel brakes mounted on wheels so as to be operated based on the hydraulic pressure output from the hydraulic pressure generating device;
   electrically operated parking brake drive device which generates an operating force for operating one of
      said wheel brakes, and
      dedicated parking brakes mounted on wheels separately from the wheel brakes,
   in response to energization of the electrically operated parking brake drive device, and which can be maintained in an operated state even upon cancellation of the energization while in the operated state;
   a controller for controlling the energization of the electrically operated parking brake drive device;
   a braking force related amount detector for detecting a physical quantity related to a braking force exhibited by each of the hydraulic pressure operated wheel brakes; and
   normally-open solenoid valves interposed between the hydraulic pressure generating device and the hydraulic pressure operated wheel brakes; wherein
   the controller staffs the energization of the electrically operated parking brake drive device when the physical quantity detected by the braking force related amount detector exceeds a reference value in a stopped state of the vehicle;
   the controller closes the solenoid valves when the physical quantity detected by the braking force related amount detector has decreased by an amount which exceeds a predetermined value, the predetermined value comprising a value by which a brake-operating force can be determined to be cancelled within a time period extending from the staff of the operation of the electrically operated parking brake drive device until the operational amount of the electrically operated parking brake drive device reaches a target operational amount; and
   the controller determines that the electrically operated parking brake drive device has broken down when the operational amount of the electrically operated parking brake drive device does not reach the target operational amount although a predetermined time has elapsed after the staff of the operation of the electrically operated parking brake drive device, and when a breakdown has been determined, the controller carries out a process associated with the breakdown.

2. A brake system for a vehicle according to claim 1, wherein the reference value is set to be larger than a value of the physical quantity corresponding to a braking force required to maintain the vehicle in the stopped state.

3. A brake system for a vehicle according to claim 2, wherein the controller controls the energization and operation of the electrically operated parking brake drive device while determining the target operational amount so as to obtain a braking force required for maintaining the stopped state of the vehicle.

4. A brake system for a vehicle according to claim 1, further including a shift position determining device for determining whether or not a shift position of an automatic transmission mounted on the vehicle is a parking position; and when the shift position determining device determines that the shift position is the parking position, the controller starts the energization of the electrically operated parking brake drive device based on a reference value set to be larger than that when the shift position is a non-parking position.

5. A brake system for a vehicle according to claim 1, wherein the controller finishes closing the solenoid valves when the operational amount of the electrically operated parking brake drive device reaches the target operational amount.

6. A brake system for a vehicle according to claim 1, wherein the reference value is set to be larger than the physical quantity required to maintain the vehicle in a stopped state in accordance with a gradient of a road surface.

7. A brake system for a vehicle according to claim 1 wherein the hydraulic pressure generating device comprises a master cylinder.

8. A brake system for a vehicle according to claim 1 wherein the brake system further comprises a hydraulic pressure control circuit which connects the hydraulic pressure generating device and the wheel brakes, and wherein
   the controller controls the operations of the hydraulic pressure control circuit and the electrically operated parking brake drive device based on signals input into the controller from the following members:
   an automatic operation permitting switch which permits switching between permission and non-permission of the automatic operations of the electrically operated parking brake drive device;
   a manual operation instructing switch which permits instruction by a manual operation the braking operation of the electrically operated parking brake drive device and the cancellation of the braking operation;
   wheel speed sensors which detect wheel speeds of the vehicle wheels;
   a shift position determining device which determines the shift position of an automatic transmission of the vehicle;
   braking hydraulic pressure sensors which detect braking hydraulic pressures within the circuit;
   operational amount detectors which detect an operational amount of the electrically operated parking brake drive device.

9. A brake system for a vehicle, comprising:
   a hydraulic pressure generating device which outputs a hydraulic pressure corresponding to a braking operation by a vehicle driver;
   hydraulic pressure operated wheel brakes mounted on wheels so as to be operated based on the hydraulic pressure output from the hydraulic pressure generating device;
   electrically operated parking brake drive device which generates an operating force for operating one of
      said wheel brakes, and
      dedicated parking brakes mounted on wheels separately from the wheel brakes,
   in response to energization of the electrically operated parking brake drive device, and which can be maintained in an operated state even upon cancellation of the energization while in the operated state;

a controller for controlling the energization of the electrically operated parking brake drive device; and a braking force related amount detector for detecting a physical quantity related to a braking force exhibited by each of the hydraulic pressure operated wheel brakes; wherein the controller starts the energization of the electrically operated parking brake drive device when the physical quantity detected by the braking force related amount detector exceeds a reference value in a stopped state of the vehicle;

wherein the hydraulic pressure operated wheel brakes comprise disk brakes, each disk brake actuated by a piston, and wherein the electrically operated parking brake drive device comprises:

an electric motor controlled by the controller;

a screw mechanism engaged with the piston; and a deceleration mechanism operably connecting the electric motor and the screw mechanism, the deceleration mechanism reducing the speed of an output of the electric motor and transmitting the reduced-speed output to the screw mechanism whereby the piston is actuated.

10. A brake system for a vehicle according to claim 9, wherein said disk brakes comprises:

a disk rotor which rotates integrally with a rim of a wheel, friction pads positioned on opposed sides of the disk rotor, a caliper body configured so as to be disposed astride the disk rotor, the caliper body movably supporting the friction pads such that the friction pads can be forcibly engaged with the opposed sides of the disk rotor, the piston is slidably disposed within a cylindrical bore formed in a body portion of the caliper body such that when the piston is advanced toward the disk rotor within the cylindrical bore, the caliper body moves to force the friction pads in engagement with the disk rotor whereby a stopping force is generated, wherein the piston is advanced by means of hydraulic pressure generated in the hydraulic pressure generation device and by means of a drive force generated by the parking brake drive device.

* * * * *